United States Patent
Lynch (10) Patent No.: US 8,156,693 B2
(45) Date of Patent: Apr. 17, 2012

(54) WILDLIFE DETERRENT FOR HIGH VOLTAGE SUPPORTING MEMBERS

(75) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 213 days.

(21) Appl. No.: 12/426,091

(22) Filed: Apr. 17, 2009

(65) Prior Publication Data

US 2010/0263302 A1    Oct. 21, 2010

(51) Int. Cl.
*E04B 1/72* (2006.01)
*E04H 9/16* (2006.01)

(52) U.S. Cl. ............. 52/101; 52/121; 174/5 R; 211/207; 248/309.1

(58) Field of Classification Search ................. 119/52.3, 119/57.9, 61.3, 537, 903; 135/99, 100, 114, 135/120.3, 121–122, 139, 140, 141; 174/5 R, 174/5 SB, 138 F, 138 R, 169, 171, 5 B, 131 A; 248/309.1, 200, 218.4, 219.1, 219.2; 256/11; 43/1, 124; 52/101, 146–152, 651.02, 121; 211/175, 207; 403/232.1, DIG. 15; A01K 3/00; E04B 1/72; E04H 9/16
See application file for complete search history.

(56) References Cited

U.S. PATENT DOCUMENTS

| | | | | |
|---|---|---|---|---|
| 287,078 A * | 10/1883 | Amrock | ............................ | 5/113 |
| 361,505 A * | 4/1887 | Gray | ................................ | 135/98 |
| 403,977 A * | 5/1889 | Wicker et al. | ................... | 256/35 |
| 947,790 A * | 2/1910 | Carter | ............................. | 135/31 |
| 1,180,729 A * | 4/1916 | Marshall | ........................ | 174/5 R |
| 1,407,540 A * | 2/1922 | Holsinger | ........................ | 256/48 |
| 1,449,894 A * | 3/1923 | Dial | ................................ | 135/98 |
| 1,633,820 A * | 6/1927 | Long et al. | ........................ | 5/119 |
| 1,685,663 A * | 9/1928 | Austin | ......................... | 174/45 R |
| 1,847,460 A * | 3/1932 | Austin | ........................ | 361/118 |
| 1,970,741 A * | 8/1934 | Evans | ............................. | 52/152 |
| 2,283,050 A * | 5/1942 | Fisher | ........................... | 174/5 R |
| 2,339,327 A * | 1/1944 | Fox | ................................. | 169/67 |
| 2,344,134 A * | 3/1944 | Davis | ............................ | 254/338 |
| 2,416,848 A * | 3/1947 | Rothery | ........................ | 248/170 |
| 2,638,188 A * | 5/1953 | Corn | ............................... | 52/149 |
| 2,645,315 A * | 7/1953 | Frushour | ......................... | 52/114 |
| 2,784,556 A * | 3/1957 | Perdue | ............................ | 60/398 |
| 3,302,345 A * | 2/1967 | Ballantine | ........................ | 52/121 |
| 3,362,115 A * | 1/1968 | Nyhus et al. | .................... | 52/101 |

(Continued)

FOREIGN PATENT DOCUMENTS

DE         3906213 A1 *   8/1990

(Continued)

*Primary Examiner* — Brian Glessner
*Assistant Examiner* — Joseph J Sadlon
(74) *Attorney, Agent, or Firm* — Patent Law Group LLP; Brian D. Ogonowsky (57) ABSTRACT

A wildlife deterrent for a utility support structure member between two conductors includes a bracket for attachment to the supporting member, a center support piece with a variable height arm connector, and two adjustable arms pivotally attached to the arm connector. No tools are required for the adjustments or attachments. Since the effective lengths of the support and arms are adjustable, either by elongation or using different length parts, the same angle of the arms can be achieved no matter what the separation between the conductors, and the gap between the arms and the conductor can be optimal for both deterrence and flashover prevention. The different pieces forming the deterrent can be selected by the lineman to quickly build an optimal deterrent in the field.

20 Claims, 11 Drawing Sheets

U.S. PATENT DOCUMENTS

| | | | | |
|---|---|---|---|---|
| 3,626,958 | A * | 12/1971 | Ross | 135/98 |
| 4,110,943 | A * | 9/1978 | Carlson | 52/101 |
| 4,435,931 | A * | 3/1984 | Newbanks | 52/147 |
| 4,578,920 | A * | 4/1986 | Bush et al. | 52/645 |
| 4,836,232 | A * | 6/1989 | De Rosa et al. | 135/99 |
| 5,025,606 | A * | 6/1991 | McGinnis et al. | 52/745.17 |
| 5,377,619 | A * | 1/1995 | Katz | 119/461 |
| 5,391,834 | A * | 2/1995 | Place | 174/5 R |
| H001421 | H * | 3/1995 | Fine | 343/726 |
| 5,490,532 | A * | 2/1996 | Mallookis et al. | 135/117 |
| 5,713,160 | A * | 2/1998 | Heron | 52/101 |
| 6,402,107 | B1 * | 6/2002 | Chervick et al. | 248/226.11 |
| 6,534,719 | B2 * | 3/2003 | Wright | 174/139 |
| 6,918,214 | B2 * | 7/2005 | Sabine | 52/101 |
| 7,036,161 | B2 * | 5/2006 | Harrison et al. | 5/99.1 |
| 7,380,563 | B2 * | 6/2008 | Seo | 135/145 |
| 2002/0070532 | A1 * | 6/2002 | Harrison et al. | 280/647 |
| 2002/0117313 | A1 * | 8/2002 | Spencer | 174/5 R |
| 2002/0178683 | A1 * | 12/2002 | Phillips | 52/651.1 |
| 2004/0144414 | A1 * | 7/2004 | Seo | 135/131 |
| 2005/0161070 | A1 * | 7/2005 | Parsons | 135/135 |
| 2007/0144425 | A1 * | 6/2007 | Buckley | 114/361 |
| 2008/0110106 | A1 * | 5/2008 | Holly | 52/101 |

FOREIGN PATENT DOCUMENTS

| | | | |
|---|---|---|---|
| GB | 2054002 | A * | 2/1981 |

* cited by examiner

WILDLIFE DETERRENT FOR HIGH VOLTAGE SUPPORTING MEMBERS

FIELD OF THE INVENTION

This invention relates to a wildlife deterrent for use on an electric transmission and distribution system structure, such as a crossarm, pole, or other supporting structure, to prevent electrocution of birds and other wildlife that complete an electrical path phase to phase or phase to ground.

BACKGROUND

Electrical transmission and distribution circuits include conductors supported by grounded support structures such as wooden poles, steel poles, concrete poles, and lattice towers. The support structures are essentially grounded since they are embedded in the earth. Each conductor (or wire) is separated from the grounded structure by an insulator, such as a ceramic insulator. The insulators also provide separation between the conductors (or phases). The phase separation is determined by the circuit voltage, the proximity to ground, and the length of the span.

Insulators are manufactured in various sizes and shapes according to industry standards. The insulator chosen for use on a support structure varies in size and is dependent on the circuit voltage as well as other electrical and physical characteristics.

The construction and design of support structures vary for single phase and three phase electrical circuits. The insulators and phases attached to a crossarm or supporting member may all be at the same level horizontally and separated a certain distance according to industry standards. Or, they may be configured vertically and attached to the support structure by means of a bracket or supporting member.

The distance between the insulators, energized phases, and ground potential varies according to the circuit voltage and other characteristics. If a bird, squirrel, or other animal perched or sitting on a support structure, supporting member, conductor, or insulator completes a circuit phase to phase, or phase to ground, a flashover will occur, resulting in an outage, disrupting power to customers, and the death of the animal.

Electricity is always seeking a path to ground. Therefore, industry guidelines recommend that energized conductors have adequate separation phase to phase and phase to ground. This separation is referred to as clearance. Electricity flows over the surface of a conductor or insulator. With regards to insulators, the separation or surface area between the conductor and ground is referred to as leakage distance. Typically, insulators are manufactured with skirts to lengthen the surface distance phase to ground and minimize the overall height of the insulator. If an animal approaches the energized conductor or insulator and provides a conductive path to ground, or if an animal effectively reduces the necessary separation or clearance of two energized conductors, a short will occur in the circuit, resulting in a momentary or permanent outage. Depending on the circuit voltage, this animal does not necessarily have to come in direct contact with the energized conductor or insulator for the electricity to discharge across to the conductive path. Mylar balloons have also been known to create the short circuit. Additionally, the shorting could also be caused by an improperly installed or damaged wildlife deterrent device installed by a lineman with insufficient clearance from the energized conductors and insulators. It is essential that adequate separation or clearance be maintained phase to ground and phase to phase.

The present invention relates to an improved wildlife deterrent for use on a high voltage utility support structure, such those generally used to support electrical distribution conductors between substations and homes or businesses. The conductors typically carry AC voltages under 75 kV and as little as 120 V. Such supporting structures may have multiple supporting members, where the highest supporting member supports conductors carrying the highest voltage. Medium to high voltage conductors are frequently not shielded by insulation.

Some wildlife deterrents are known. One type of deterrent is a preformed plastic triangle that is bolted to the support member between two conductors, where the closest distance between a triangle arm and a conductor is insufficient to cause a flashover through the plastic but close enough to prevent an animal going between the conductor and the triangle. However, although rigidly-shaped deterrents may be suitable for some insulator spacings, the same deterrent may not be suitable for a range of insulator spacings. Therefore, different sizes of such deterrents must be on hand for the lineman, or a compromise must be made by using the single deterrent for different situations.

An adjustable-angle deterrent is manufactured by Hendrix Conductor & Cable, Inc. that consists of two arms attached at a pivot point. The arms are spread to provide the desired distance between each arm and its closest conductor, while not leaving room for an animal to perch between the arm and the conductor, and the free ends of the arms are nailed or lagged to the supporting member to form a triangle. However, with such a deterrent, the angle becomes less and less as the arms are spread wider and wider to accommodate different spacings of conductors. This design cannot be used on metal or concrete type supporting structures due to the method of nailing or lagging. Therefore, there must be a compromise between: 1) the closest space between the deterrent and the conductor to deter wildlife yet avoid flashover between the conductor and the deterrent; and 2) the angle of the arms, where a steep angle of the arms is needed to deter animals perching on the arms.

Another type of wildlife deterrent, manufactured by Midsun Group, Inc., has a fixed-length vertical rod and two sets of three pivoting arms extending from opposite sides of the vertical rod. The six arms prevent a bird from roosting on the support member, provided the insulators and conductors are spaced adequately from the arms of the deterrent. If the insulators and conductors are spaced beyond the maximum width of the deterrent and there is too much clearance between the deterrent and the insulator, the deterrent becomes ineffective. Further, as the arms are spread out and become more horizontal to widen the overall design of the deterrent, the arms do not maintain the angle needed to discourage a bird from landing on them. The deterrent effectively becomes an inviting perch instead of a deterrent to perch.

Conversely, if the insulators are spaced close together, the deterrent may jeopardize the phase to phase spacing.

What is needed is an adjustable wildlife deterrent for utility support structures that can be easily and quickly configured by the lineman for optimal deterrence by maintaining critical angles to discourage birds and wildlife from perching and sitting next to energized conductors and insulators and provide the necessary adjustability for clearance issues to prevent flashover from occurring phase to ground, phase to phase, with varying conductor and insulator spacings.

SUMMARY OF THE INVENTION

In one embodiment, a wildlife deterrent for a utility support structure is attached to a conductor/insulator supporting member between two conductors. The deterrent includes a bracket for attachment to a supporting member, a separate center support piece having an adjustable height arm connector, and two variable-length arms pivotally attached to the arm connector on the center support piece, where the other ends of the arms are connectable to the supporting member. The variable-length arms may be adjustable-length arms or an assortment of arms of different lengths. The deterrent forms a triangle shape when connected together, and since the height of the arm connector on the center support and the lengths of the arms are variable, the optimal angle of the arms can be achieved and maintained no matter what the separation between the conductors, and the gap between the arms and the conductors can be optimal for both deterrence and flashover prevention.

In another application, the deterrent is next to a conductor on one side but there is no conductor proximate to the other side of the deterrent.

In another embodiment, the pivotally attached arms are short and have ends that do not attach directly to the supporting member.

In one embodiment, the arms may be attached anywhere along the length of the center support, allowing any number of arms to be connected.

In one embodiment, the center support has an adjustable height, rather than or in addition to the arm connector being connectable anywhere along the center support.

In one embodiment, the deterrent can be mounted on the side of a vertical support structure that supports conductors running along the sides of the support structure, where the variable arms only extend from one side of the center support piece.

In one embodiment, the same arms may be used for connection to the center support piece to create a medium or large deterrent or connected directly to each other at their pivot point for creating a small deterrent for closely spaced conductors.

All attachments and adjustments are made by hand-operated clips, or other types of interlocking devices, so no tools are needed. The entire structure is formed of a plastic (e.g., PVC) or other dielectric.

The invention allows many different sizes and shapes of deterrents to be created using the same parts. Forming a deterrent to have customized characteristics, depending on the conductor spacing and type of support structure, enables a lineman to optimize the deterrent in the field without requiring the stocking of many different sizes and shapes of deterrents.

BRIEF DESCRIPTION OF THE DRAWINGS

Elements labeled with the same numerals may be identical or similar.

DETAILED DESCRIPTION

Figure 1A:
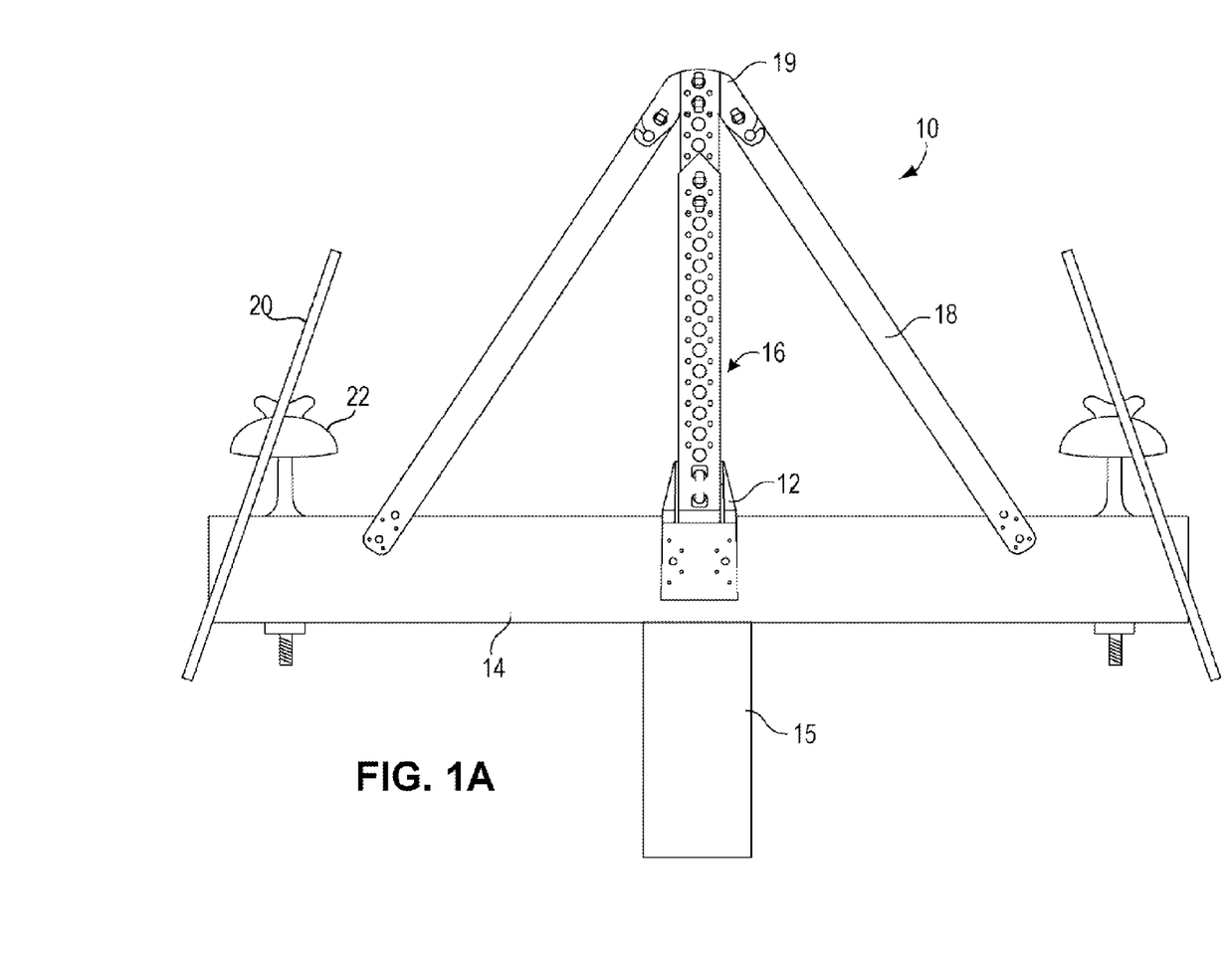
FIG. 1A illustrates one embodiment of a wildlife deterrent, in accordance with an embodiment of the invention, mounted on a supporting member of a utility support structure.

FIG. 1A illustrates an embodiment of the wildlife deterrent 10 in accordance with one embodiment of the invention. A bracket 12 for the deterrent 10 is nailed or lagged (using a lag screw) to a wooden supporting member 14 of a utility support structure 15. An adjustable-length center support 16 is connected to the bracket 12 by hand-releasable clips (seen in greater detail in FIG. 3). Two arms 18 are connected near the top of the center support 16, via a connector piece 19, by hand-releasable clips (seen in greater detail in FIGS. 6-8). The middle portion of the connector piece 19 is obscured by the top of the center support 16. The entire deterrent 10 may be molded plastic, such as one-eighth inch thick PVC or polyethylene. The plastic is of a type that has well-defined dielectric characteristics and long life outdoors.

The center support 16 has an adjustable length to allow the deterrent 10 to be adapted to different separations between conductors 20. Each conductor 20 is supported by a ceramic insulator 22 bolted through the supporting member 14. The conductor voltage will typically be less than 75 kV and most likely less than 50 kV.

In one embodiment, the arms 18 have an adjustable length. In another embodiment, the lineman selects from a plurality of arms 18 in stock having different lengths, depending on the optimal shape of the deterrent 10.

The optimal shape of the deterrent 10 is when the arms 18 are close enough to the conductors 20 to prevent a bird, squirrel, or other targeted animal from perching or walking between the arm 18 and the conductor 20. There is no problem with flashover if the animal goes between the two arms 18, since the animal could not touch a conductor 20. Another aspect of an optimal shape of the deterrent 10 is having the arms 18 at a steep angle with respect to horizontal so that a bird would not perch on the arms 18. A good angle is between 50°-77° relative to the supporting member 14. To provide both optimal attributes of the deterrent 10, the center support 16 is adjustable in height, and the arms 18 are either adjustable in length or selected from a stock of arms 18 of different lengths. All adjustments should be made without the use of tools.

Figure 1B:
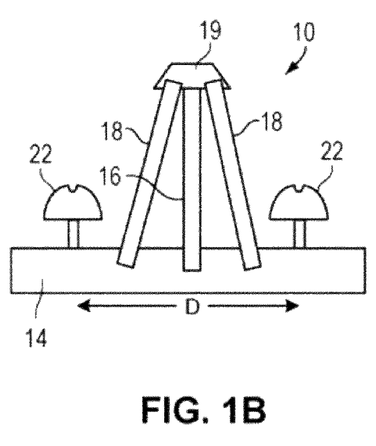
FIG. 1B illustrates the deterrent of FIG. 1A being optimized for conductors having a close spacing of D.
Figure 1C:
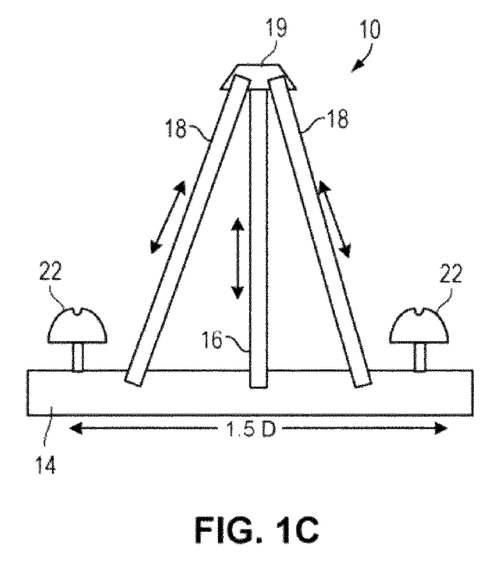
FIG. 1C illustrates the deterrent of FIG. 1A being optimized for conductors having a wider spacing of 1.5 D by adjusting the lengths of the center support and arms and adjusting the arm angles.

FIG. 1B illustrates the deterrent 10 optimally configured for closely spaced insulators 22 with a spacing of D, and FIG. 1C illustrates the deterrent 10 optimally configured for widely spaced insulators 22 with a spacing of 1.5 D. The same deterrent 10 may be used in FIGS. 1B and 1C, with its center support 16 and arms 18 lengthened using the clips and holes shown in FIGS. 2-8. In one embodiment, the lengths of the center support 16 and arms 18 are adjustable up to being approximately double the minimum lengths. For a supporting member supporting three conductors (two spaces between conductors), two deterrents 10 would be used on the supporting member, and the deterrents 10 would have different configurations if the spacings between the conductors were different.

Figure 2:
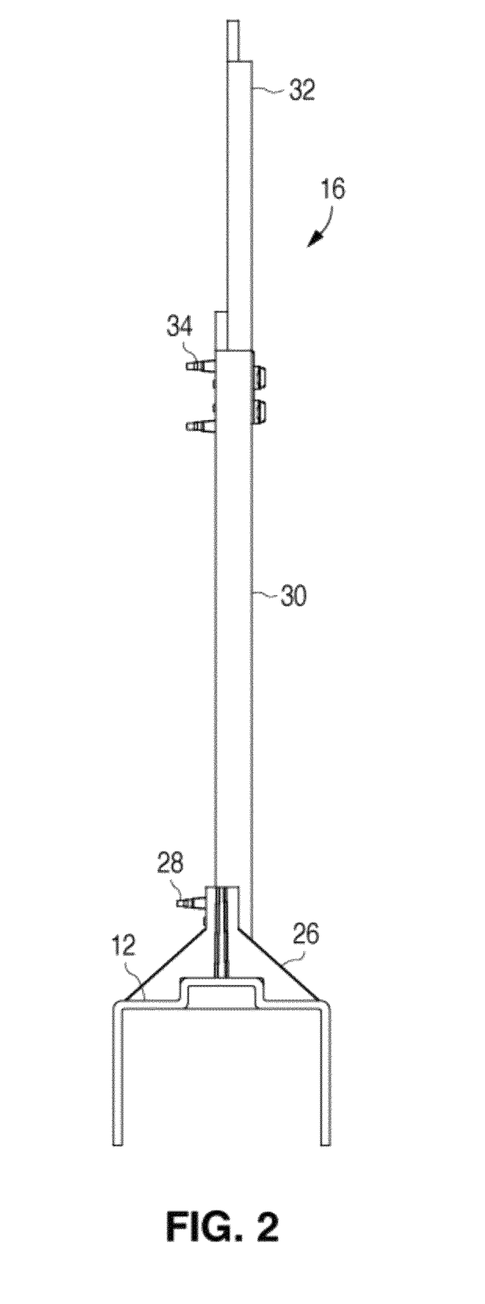
FIG. 2 is a side view of the adjustable-length center support of FIG. 1A.
Figure 3:
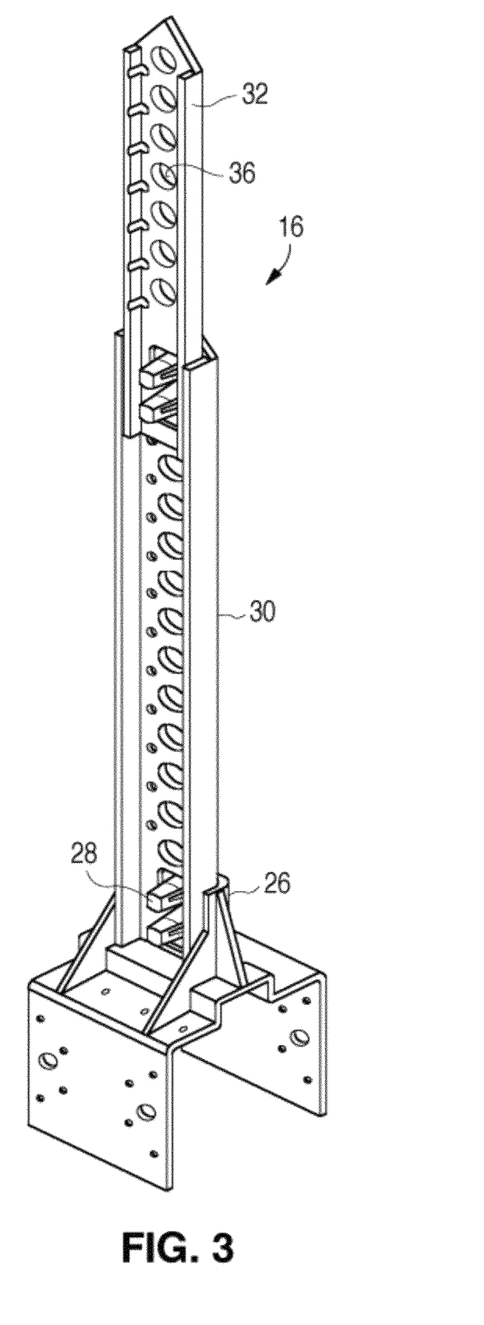
FIG. 3 is a perspective view of the adjustable-length center support of FIG. 2.

FIG. 2 is a side view of the center support 16 and attached bracket 12, and FIG. 3 is a perspective view of the support 16 and bracket 12.

The bracket 12 has sides that fit over a standard supporting member and has small holes for being nailed or screwed to the supporting member. The bracket 12 has a receiving area 26 for the center support 16 with resilient plastic clips 28 that snap into the two bottom holes in the center support 16 to firmly secure the support 16 to the bracket 12 and supporting member. All the clips used throughout the deterrent 10 may be identical.

The support 16 consists of a lower portion 30 and a narrower upper portion 32 that slides with respect to the lower portion 30 within a channel. The lower portion 30 includes two clips 34 near its top. Any set of holes 36 along the length of the upper portion 32 can be pushed over the clips 34 to secure the upper portion 32 in place for adjusting the length of the center support 16.

Figure 7:
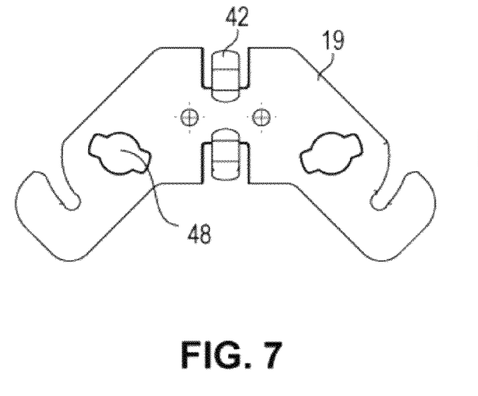
FIG. 7 is a front view of a connector that is connectable along the length of a center support and is used to pivotally connect the arm of FIG. 4 to the center support of FIG. 3.
Figure 8:
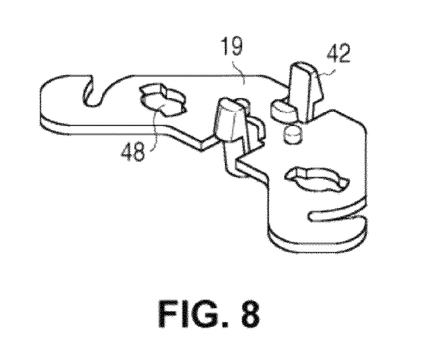
FIG. 8 is a perspective view of the connector of FIG. 7.

FIG. 7 is a front view of a connector piece 19 for the center support 16 that snaps into the top two holes of the upper portion 32 using resilient clips 42. FIG. 8 is a perspective view of the connector piece 40. The clips 42 may be released by pushing up or down on them.

Figure 4:
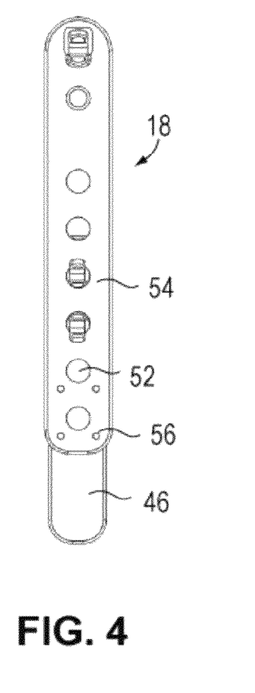
FIG. 4 is a front view of an adjustable-length pivoting arm connectable anywhere along the length of the center support of FIG. 3. (The arms are shown in their minimum length position for storage.)
Figure 5:
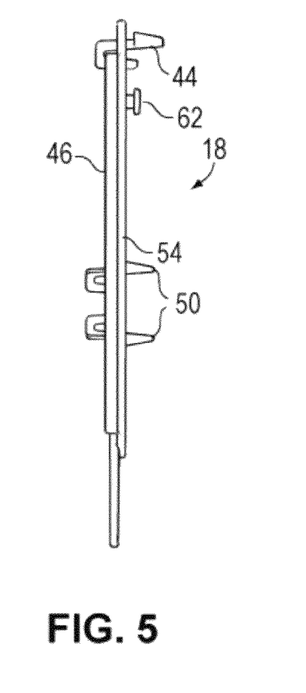
FIG. 5 is a side view of the adjustable-length pivoting arm of FIG. 4.
Figure 6:
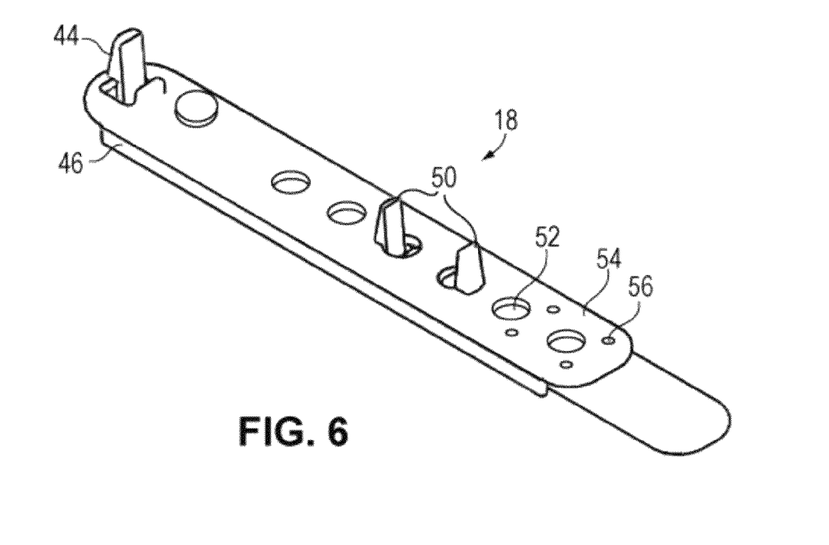
FIG. 6 is a perspective view of the adjustable-length pivoting arm of FIG. 4.

Adjustable arms 18 are shown in the different views of FIGS. 4-6. The arms 18 shown are short for illustration but may be adjustable from 1.5-3 feet. The arms 18 are also shown in their stored configuration, having their minimum length for storage. Other adjustable lengths are envisioned along with fixed length arms of any length for use with the adjustable center support 16. A top clip 44 of an upper arm 46 clips into a hole 48 in the connector piece 19 (FIG. 7) to allow the upper arm 46 to pivot. The upper arm 46 includes a pair of oppositely-engaged clips 50 that engage any pair of holes 52 in a lower arm 54 to adjust the overall length of the arm 18. The maximum length of the arms 18 should be greater than the maximum length of the center support 16. The adjustable arms 18 use the same basic adjustment mechanism as the upper and lower portions of the center support 16 but do not need to be as robust.

The end of the lower arm 54 includes holes 56 for nailing or screwing to the supporting member.

Figure 9:
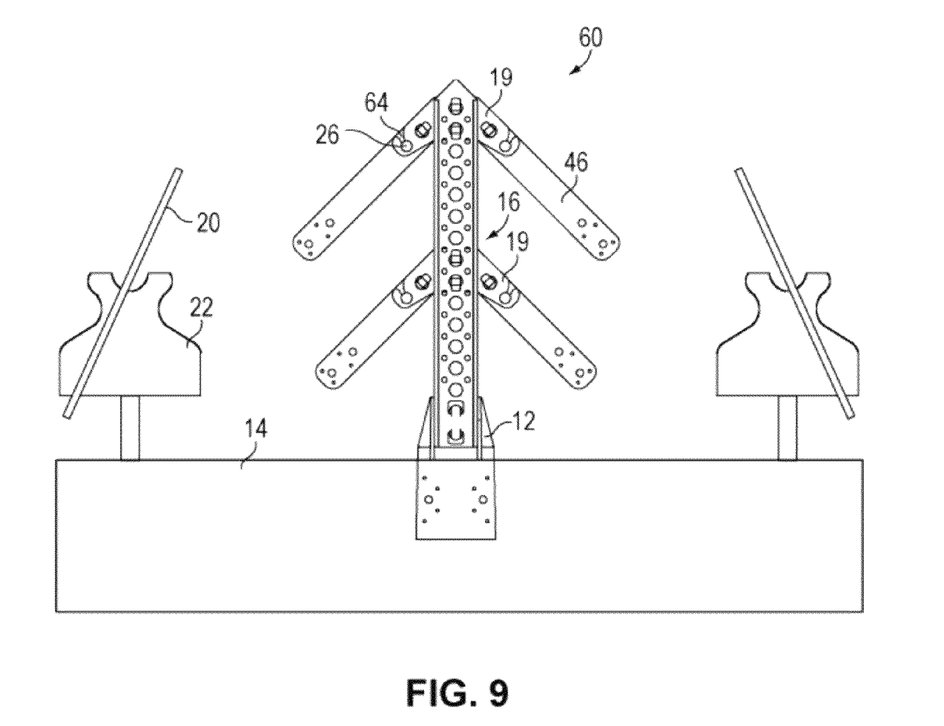
FIG. 9 illustrates the center support of FIG. 3 supporting arms that do not extend down to the supporting member, where the downward angle of the arms is limited by a mechanical stop.

Since the deterrent 10 is formed of various pieces that easily snap together, any combination of the pieces is possible. FIG. 9 illustrates a deterrent 60 whose arms are only formed of the upper arm 46 portion. The top clip 44 of the upper arm 46 is snapped into the hole 48 (FIG. 8) of the connector piece 19. A plastic stop (a tab) 62 extends from the upper arm 46 and fits within a groove 64 formed in the connector piece 19 to limit the downward angle of the arms 46 to provide support. The stop 62 is also shown in the FIG. 5 side view of the upper arm 46, where the stop 62 is shown extending through a hole in the lower arm 54 when the arms are in their minimum length configuration during storage.

As shown in FIG. 9, a second connector piece 19 is clipped to the center support 16 at a midway position to support a second set of arms 46.

The center support 16 in FIG. 9 can be any length, and the arms could be the adjustable types so that the arms could be adjusted to span any practical distance between conductors (to prevent an animal contacting a conductor while perching on the supporting member) while being at an optimal angle for deterring birds landing on the arms. Any number of arms can be attached to the support 16 by adding more connector pieces 19.

Figure 10:
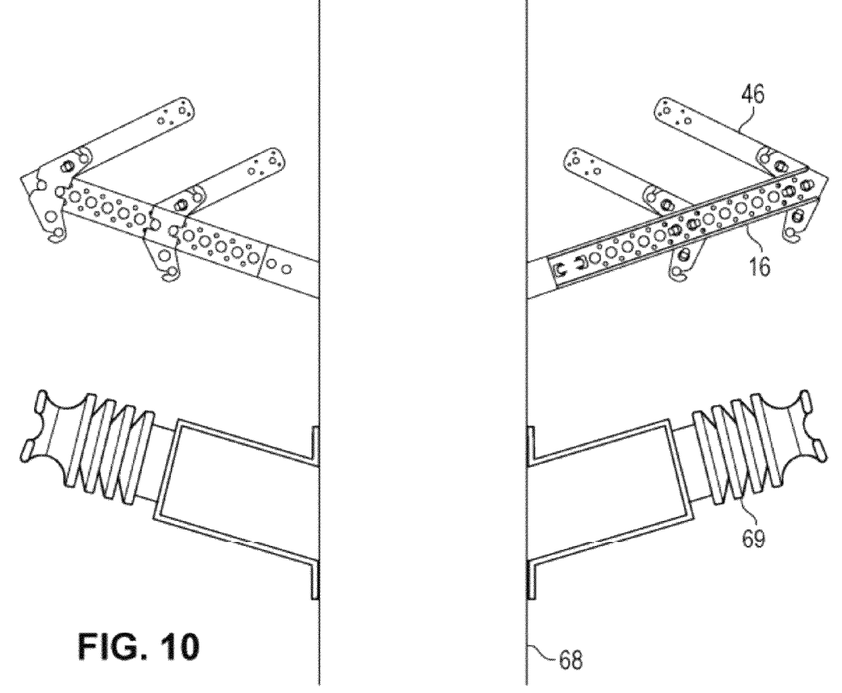
FIG. 10 illustrates a deterrent mounted on the side of a vertical support structure.

FIG. 10 further illustrates the flexibility of forming a deterrent from various pieces, where the deterrent is mounted to the side of a support structure 68. In FIG. 10, the same deterrent of FIG. 9 is used but with the upper arms 46 extending from only one side of the support 16 to prevent a bird from perching on the insulator 69. A bird would not perch on the steeply angled upper arms 46.

Figure 11:
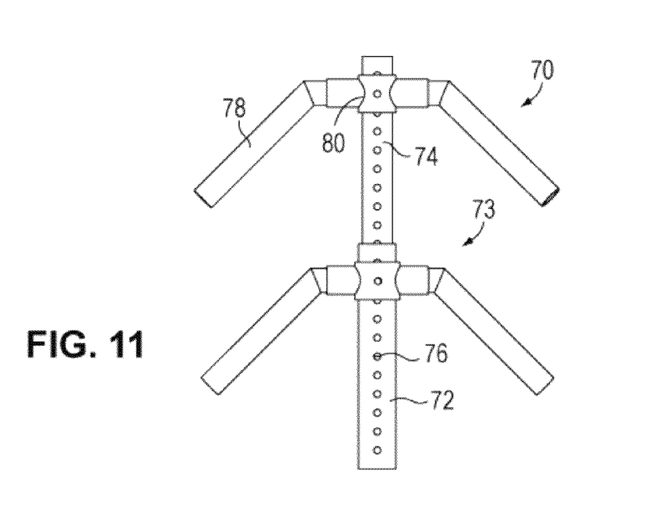
FIG. 11 illustrates a variation of the deterrent of FIG. 9.

FIG. 11 illustrates a deterrent 70 formed of PVC piping. A lower portion 72 of the center support 73 receives a smaller-diameter upper portion 74 that slides within the lower portion 72. When the desired length is achieved, a key 76 or other locking device is inserted through the aligned holes to fix the length. The arms 78 are supported by sleeves 80 that slide along the length of the upper portion 74 or the lower portion 72. When the desired position is achieved, a key or locking device is inserted through the aligned holes to fix the position.

Figure 12:
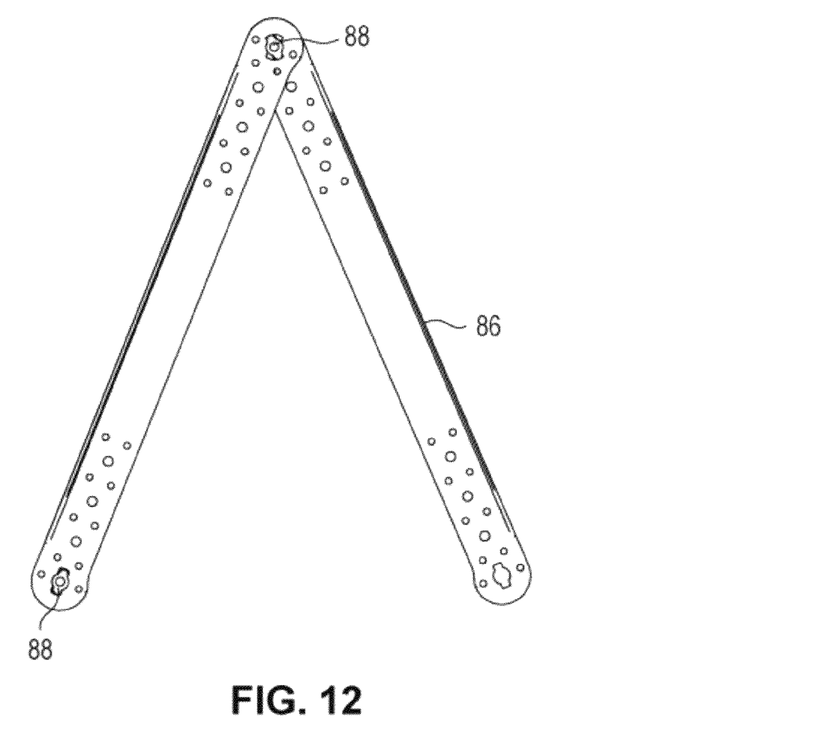
FIG. 12 is a front view of arms connected at a pivot point that may be the same arms connectable to the connector of FIG. 7, illustrating the various configurations of deterrents that may be created with the same set of parts.
Figure 13:
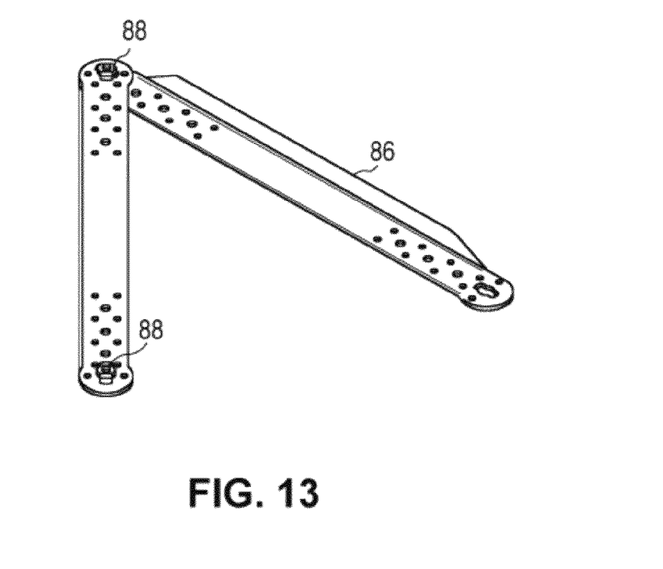
FIG. 13 is a perspective view of the arms of FIG. 12.

FIG. 12 (front view) and FIG. 13 (perspective view) illustrate a different arm design. The arms 86 are identical and each includes a plastic clip 88 at one end. The arms 86 may be directly snapped together and affixed to a supporting member using nails without a center support 16 (FIG. 3), or the arms 86 may be connected to the connector piece 19 (FIG. 8) that is snapped onto the center support 16. The lineman snaps the deterrent together in the field to adapt to a certain situation. The arms 86 may come in a variety of lengths rather than be adjustable. Alternatively, the arms that are snapped together in the configuration of FIGS. 12 and 13 may be the adjustable type shown in FIGS. 4-6.

The required spacings between the plastic arms and the conductors may be found in existing publications published by IEEE, or the electric company, or other sources. The National Electrical Safety Code identifies required distances between out-of-phase conductors and between conductors and ground for various voltages.

FIGS. 14-25 illustrate insulating (e.g., molded plastic) deterrents and interlocking pieces used to create a deterrent, where the interlocking device comprises an inverted keyhole shaped opening (a round opening with a narrowed slot) in one piece and a flat round head with a short neck on another piece, where the head is inserted through the round opening and slid so that the neck moves into the slot.

Figure 14:
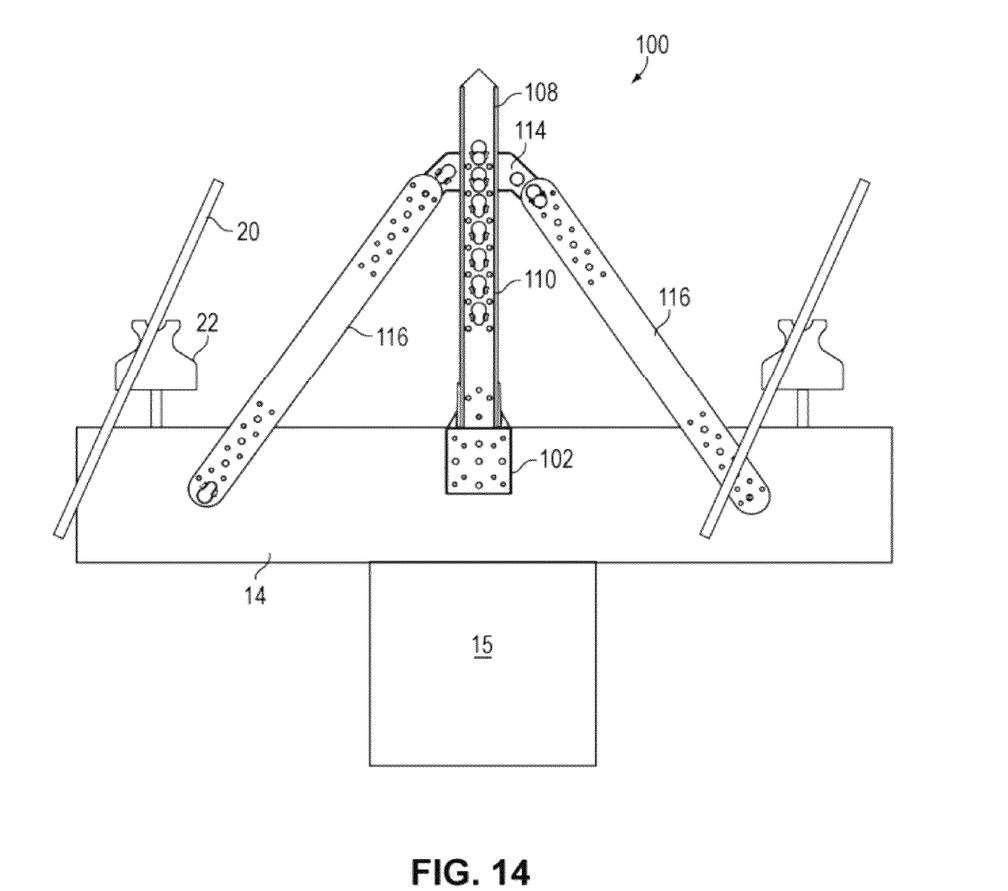
FIG. 14 illustrates another embodiment of a deterrent similar to FIG. 1A but using a different type of interlocking device for all the pieces.
Figure 15:
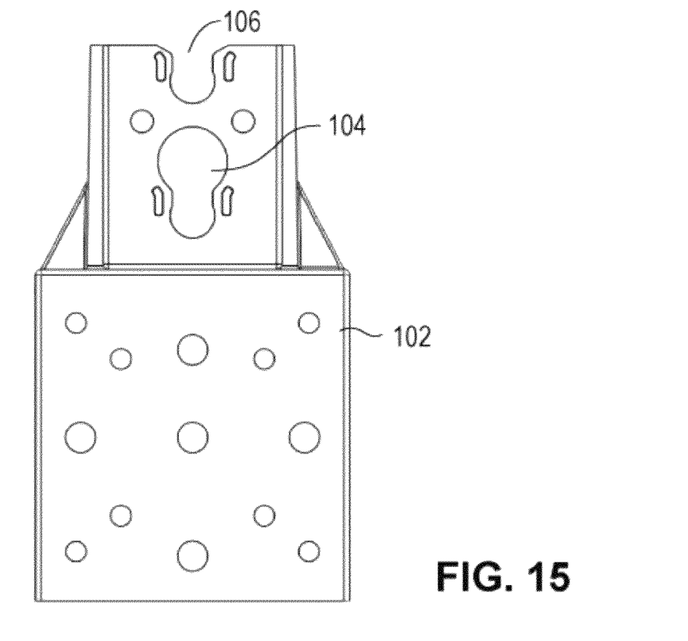
FIG. 15 is a front view of the bracket used in FIG. 14.
Figure 16:
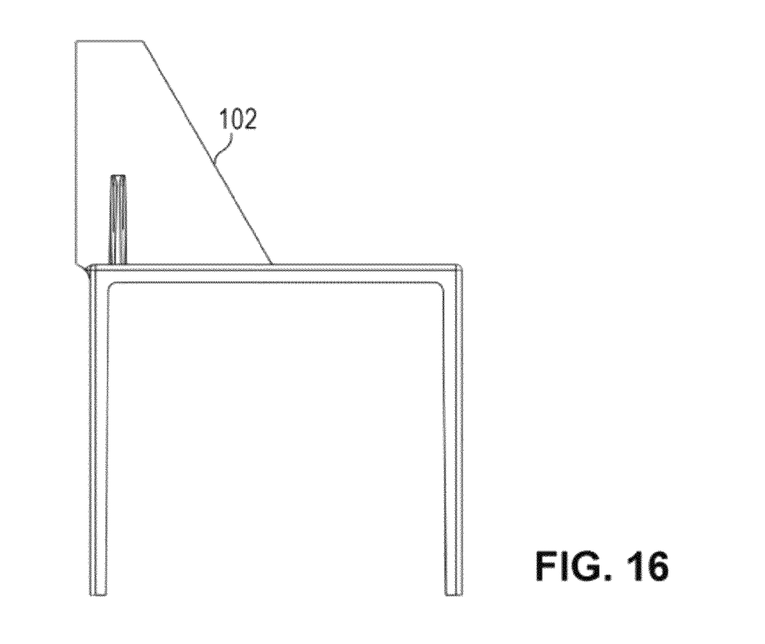
FIG. 16 is a side view of the bracket used in FIG. 14.

FIG. 14 illustrates a deterrent 100 similar to FIG. 1A but using a different type of interlocking device for all the pieces. FIG. 15 is a front view of the bracket 102 used in FIG. 14, and FIG. 16 is a side view of the bracket 102 used in FIG. 14. The bracket 102 may be nailed or screwed to support member 14 in FIG. 14. The bracket has an inverted keyhole opening 104 and a slot 106 identical to the bottom of the opening 104.

Figure 17:
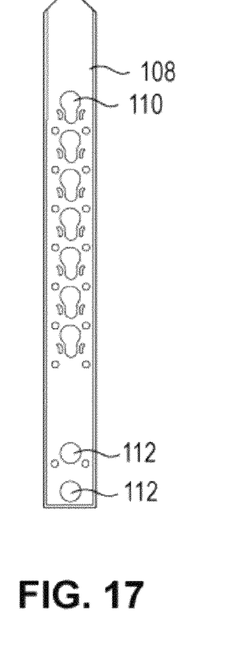
FIG. 17 is a front view of the center support used in FIG. 14.
Figure 18:
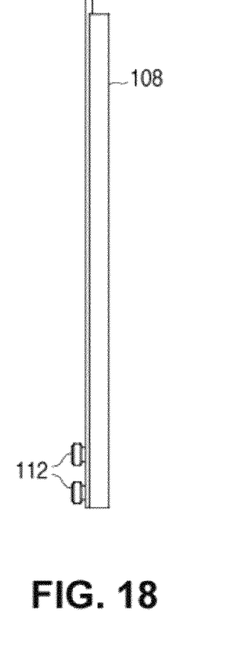
FIG. 18 is a side view of the center support used in FIG. 14.

FIG. 17 is a front view of the center support 108 used in FIG. 14, and FIG. 18 is a side view of the center support 108 used in FIG. 14. The center support 108 has inverted keyhole openings 110 identical to the inverted keyhole opening 104 in the bracket 102. At the bottom of the center support 108 are two raised heads 112. For attachment to the bracket 102, the bottom head 112 is inserted through the opening 104, and the center support 110 is pushed downward to lock the heads 112 within the slots (slot 106 and bottom of opening 104). All parts are molded as unitary pieces.

Figure 19:
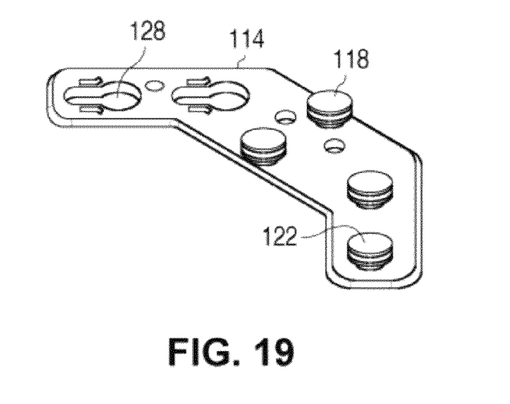
FIG. 19 is a perspective view of the connector used in FIG. 14 for attachment of the arms to the center support.

FIG. 19 is a perspective view of the connector 114 used in FIG. 14 for attachment of the arms 116 to the center support 108. The connector 114 has heads 118 that lock into any two openings 110 in the center support 110 so may be at any height to create an optimal angle of the arms 110.

Figure 20:
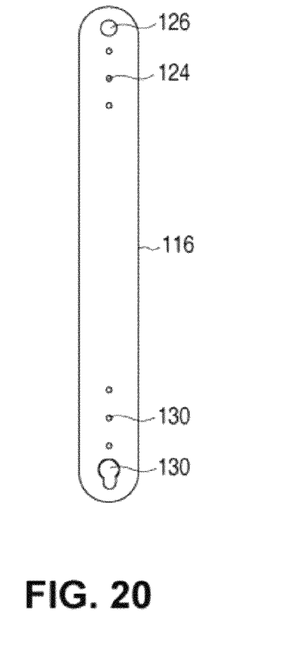
FIG. 20 is a front view of an arm that may be connected to the connector of FIG. 19 or directly to the center support of FIG. 17, where the arm may either be adjustable in length or come in different lengths.

FIG. 20 is a front view of an arm that may be connected to the connector 114 of FIG. 19 or directly to the center support 110 of FIG. 114. To connect the arm 116 to the right side of the connector 114, the inverted keyhole opening 120 of the arm 116 is locked onto the raised head 122 of the connector so it can pivot. The other end of the arm 116 is then set at the optimal angle and nailed or screwed to the supporting member 14 (FIG. 14) through one or more of the small holes 124 in the arm 116. To connect the arm 116 to the left side of the connector 114, the raised head 126 is inserted into the opening 128 of the connector 114 and locked in place so it can pivot. The other end of the arm 116 is then set at the optimal angle and nailed or screwed to the supporting member 14 (FIG. 14) through one or more of the small holes 130 in the arm 116.

Figure 21:
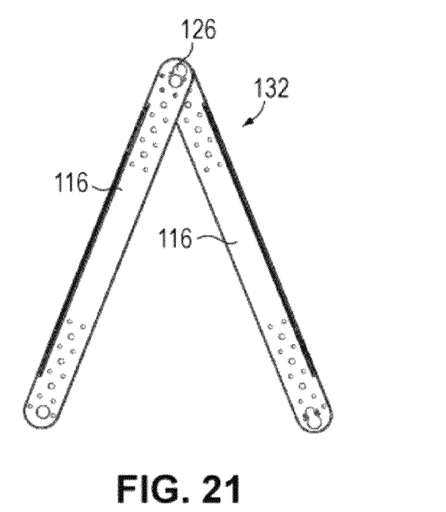
FIG. 21 is a front view of two arms, identical to the arm of FIG. 20, being pivotally connected together for a small or otherwise simple deterrent.

FIG. 21 is a front view of two identical arms 116 being pivotally connected together by inserting the head 126 into the opening 120 and locking the arms together for a small or otherwise simple deterrent 132. The free ends of the arms 116 are nailed or screwed to the supporting member 14 (FIG. 14) after creating an optimal angle of the arms 116. It is envisioned that the lineman will store in his vehicle arms 116 of various lengths, such as 10-30 inches, so that any span of the deterrent 132 can be created with any angle of the arms 116.

Figure 22:
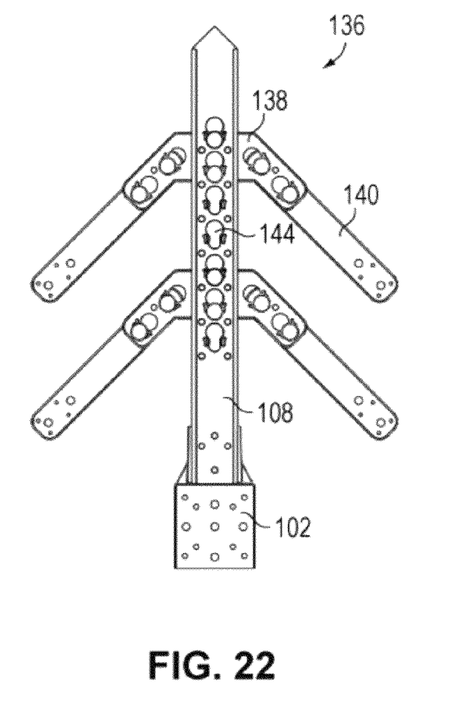
FIG. 22 illustrates the center support of FIG. 17 supporting arms that do not extend down to the supporting member, where the downward angle of the arms is fixed by the connection of two interlocking devices to the connector.
Figure 23:
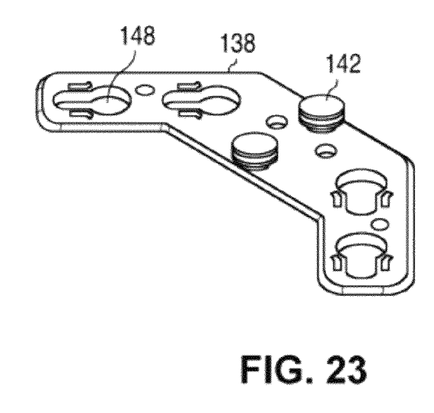
FIG. 23 is a perspective view of the connector used in FIG. 22.

The deterrent 136 of FIG. 22 is similar to deterrent 60 of FIG. 9, except for the type of interlocking device. The bracket 102 and center support 108 may be identical to that shown in FIG. 14. The connector 138 for the arms 140 can be positioned anywhere along the center support using the interlocking heads 142 and openings 144. FIG. 23 is a perspective view of the connector 138 used in FIG. 22.

Figure 24:
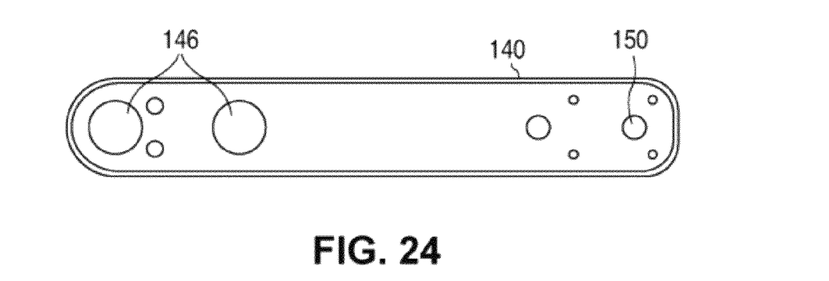
FIG. 24 is a front view of one of the arms in the deterrent of FIG. 22.
Figure 25:
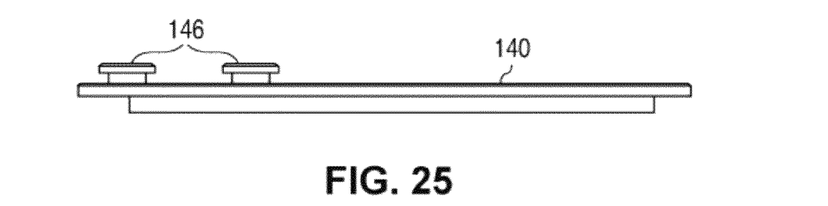
FIG. 25 is a side view of one of the arms in the deterrent of FIG. 22.

FIG. 24 is a front view of one of the arms 140 in the deterrent of FIG. 22, and FIG. 25 is a side view of one of the arms 140. The heads 146 snap into the respective openings 148 in the connector 138 so that the arms 140 are fixed in place and do not pivot. The lineman would stock arms 140 of different lengths, such as 8-20 inches, and stock center supports 108 of different lengths to achieve the necessary spans. If desired, the free ends of the arms 140 can be nailed or screwed to the supporting member 14 via holes 150.

Other types of interconnecting devices can also be used.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A wildlife deterrent for a utility support structure for prevention of flashover, the utility support structure having at least one supporting member supporting at least one insulator and at least one conductor carrying a voltage, the deterrent comprising:
    a center support having a connector portion at a bottom end of the center support connected to the supporting member of the utility support structure such that the center support is directly supported by the supporting member, the center support being formed of a dielectric insulating material;
    an arm connector, the center support having a plurality of connection locations along its length for the arm connector, the arm connector being connected directly to the center support at one of the connection locations along the length of the center support to adjust a height of the arm connector above the bottom of the center support, the arm connecter being connectable to the center support without the need for tools or other pieces, the arm connector being formed of a dielectric insulating material and
    at least one arm having two ends, one of the ends being connected directly to the arm connector without the need for tools or other pieces, the arm creating a downward angle relative to the center support when connected to the arm connector, wherein a height of the arm above the supporting member is adjustable for obtaining a desired configuration of the deterrent, the arm being formed of a dielectric insulating material.

2. The deterrent of claim 1 wherein the at least one arm is pivotally connected to the arm connector, wherein an angle of the at least one arm with respect to the supporting member is adjustable.

3. The deterrent of claim 1 wherein the at least one arm comprises at least one adjustable-length arm, a length of the adjustable-length arm being adjustable without the need for tools.

4. The deterrent of claim 1 wherein the at least one arm is connected at its other end to the supporting member.

5. The deterrent of claim 1 further comprising a bracket connected to the bottom end of the center support without the need for tools or other pieces, the bracket being directly connected to the supporting member of the utility support structure.

6. The deterrent of claim 1 wherein the arm connector is connected to the center support using first molded hand-releasable clips formed on at least one of the arm connector and center support, and the at least one arm is connected to the arm connector using second molded hand-releasable clips formed on at least one of the arm and arm connector.

7. The deterrent of claim 1 wherein the arm connector is connected to the center support, and the at least one arm is connected to the arm connector, using molded raised heads inserted into inverted keyhole openings.

8. The deterrent of claim 1 wherein the center support comprises a base portion and a movable upper portion, wherein the upper portion has connectors along its length that connect to the base portion such that the height of the center support is adjustable.

9. The deterrent of claim 1 wherein the at least one arm is fixed at an angle with respect to the center support when connected to the arm connector.

10. The deterrent of claim 1 wherein the center support, the arm connector, and the at least one arm are each a molded unitary piece.

11. The deterrent of claim 1 further comprising the center support being connected to the supporting member, the arm connector being connected to the center support, and the at least one arm being connected to the arm connector.

12. The deterrent of claim 11 wherein an end of the at least one arm opposite to the arm connector is directly attached to the supporting member.

13. The deterrent of claim 11 wherein an end of the at least one arm opposite to the arm connector is spaced above the supporting member and not directly attached to the supporting member.

14. The deterrent of claim 1 wherein the arm connector has two opposite ends, wherein the at least one arm comprises two identical arms connectable to the opposite ends of the arm connector.

15. The deterrent of claim 1 wherein the at least one arm is pivotally connected to the arm connector, wherein an angle of the arm with respect to the supporting member is adjustable, and the height of the arm connector above the supporting member is adjustable so that an angle of the at least one arm and a closest distance between the at least one arm and an insulator attached to the supporting member are independently settable.

16. The deterrent of claim 1 wherein the supporting member is horizontal.

17. The deterrent of claim 1 wherein the supporting member is vertical.

18. A method of setting up an insulating wildlife deterrent for a utility support structure for prevention of flashover, the utility support structure having at least one supporting member supporting at least one insulator and at least one conductor carrying a voltage, the method comprising:
   determining a desired distance between at least one arm of the deterrent and an insulator on the supporting member;
   affixing a bracket directly to the supporting member;
   connecting a bottom end of a center support of the deterrent directly to the bracket without tools such that the center support is directly supported by the supporting member, the center support having a plurality of connection locations along its length for an arm connector;
   connecting the arm connector directly to the center support at one of the connector locations without tools to set an adjustable height of the arm connector above the bottom end of the center support; and
   connecting the at least one arm directly to the arm connector without tools, the arm creating a downward angle relative to the center support when connected to the arm connector, wherein a height of the arm above the supporting member is manually set for obtaining a desired configuration of the deterrent.

19. The method of claim 18 wherein connecting the at least one arm to the arm connector comprises pivotally connecting the arm to the arm connector, the method further comprising setting an angle of the arm with respect to the supporting member to achieve a desired distance between the arm and the insulator, and affixing an end of the arm to the supporting member.

20. The method of claim 18 wherein the arm connector is connected to the center support before the center support is connected to the bracket.

\* \* \* \* \*